Patented June 27, 1939

2,163,629

UNITED STATES PATENT OFFICE 2,163,629

TABLET

Bernhard Rapp and Friedrich K. Russow, Darmstadt, Germany, assignors to Merck & Co., Inc., Rahway, N. J., a corporation of New Jersey No Drawing. Application August 5, 1936, Serial No. 94,431. In Germany August 13, 1935

12 Claims. (Cl. 167—82)

This invention relates to improved processes for preparing tablets which will be readily disintegrable in water, and thus also capable of more rapid solution or dispersion of their substance.

Heretofore, in preparing tablets for such service, it has been the practice to add to the effective ingredient of the tablets excipients in the nature of easily water-soluble materials such as acetamide and urea, or water-swellable materials such as hardened gelatine or starch. Another expedient has been to add materials which strongly effervesce when placed in water, with the object of disintegrating the tablet body by the force of generated gas.

However, all of these processes have the disadvantage that considerable amounts of foreign ingredients must be introduced into the tablet mass, which may interfere with the effectiveness of the tablet base or add unnecessarily to its bulk.

The method of adding water-soluble substances is not always so promptly effective because even very soluble substances are by no means always quickly soluble. If there is an appreciable amount of foreign material, aqueous solutions of tablets so prepared are frequently turbid.

Tablets prepared with effervescible material generally lose their intended effectiveness in this respect, because atmospheric action soon reduces the gasogenic power of such mixtures.

Another method, known as the "trituration process", has been introduced for the production of readily disintegrable tablets. This process comprises the moistening of a coarsely ground tablet-base with alcohol, filling the mixture into molds, and tableting with a weak pressure of the die. Special complicated tablet-making machines are required in this process, for industrial production, because it does not involve the mere direct compression of a dry granulated powder, but the formation of a moist material which cannot be poured out, and which is sometimes even of paste-like consistency. In contrast to this, it is possible, by means of the applicants' process, to use ordinary machines such as are in practical current use for making compressed tablets of the familiar type.

The process of the instant application is much more economical than the so-called "trituration process". Tablets produced according to the new process are distinguished from those made according to the "trituration process" by their greater firmness, better transportability, and more rapid disintegration in water.

We have now found a process by which, through the addition of only a small, even negligible, quantity of foreign material, tablets may be obtained which disintegrate and dissolve in water much more quickly than corresponding tablets prepared according to old methods.

Our improved process may be advantageously applied to tablet bases of varying degrees of solubility in water, and results in products which can be stored for relatively prolonged periods without impairment; but, obviously, the process of our invention may be applied to any kind of tablet base, whether it be easy, difficult, or impossible of solution in water, or whether it be homogenous or a mixture.

In general, our new process comprises mixing of the tablet base, in more or less finely powdered form, with an aqueous lather of a suitable material, drying the mixture, coarsely grinding, and compressing it into tablets in the usual manner.

Obviously, from the description herein, the process may be practiced with great simplicity, and with a wide range of choice as to tablet base material and materials for preparing the required aqueous lather.

Of course, the mixing of the powdered base with the aqueous lather should not be too protracted or too intensive, as the aqueous lather might be completely destroyed. It suffices to stir the lather slowly into the tablet base, for example, in a mixing vessel. The quantitative proportion of lather to base varies according to the nature of the materials employed, and may be easily adjusted to the most favorable level by making test samples. The lather should be as fine, stiff and persistent as possible. Any kind of aqueous lather may be employed, such as lather of albumin, gelatin, saponin, glycerrhizin, sodium nucleinate, etc., and if desirable with the addition of sugars. The materials to be employed should be so chosen as to avoid undesirable chemical or physical reactions between them. For example, hexamethylene-tetramine tablets prepared with gelatin lather do not give clear aqueous solutions, because hexamethylene-tetramine combines with gelatin to form an insoluble compound. In this particular case, saponin lather should be used.

Immediately after mixing the tablet base and the lather, the mixture is freed of excess moisture by desiccation. The swelling of the little lather bubbles will produce even greater porosity in the mass which is agglomerated by the drying, if this drying process is done under vacuum. The effect obtained is similar to that which results from quickly raising the temperature (to 120° C., for instance) of such substances (as, for example, common salt) to which such temperatures are not harmful.

To ensure smooth operation of the compressing machine in the final preparation of the tablets, the tablet material should, in many cases, still contain a certain amount of moisture after the drying operation is completed; the amount of moisture to be retained varies according to the ingredients used. The second grinding of the mass of waste material accumulated between the drying and tabletting operations should not be carried too far, in order not to destroy the remaining porosity. As a rule, it is sufficient to grind the mass to a gritty-like consistency. For the compression step the pressure of the die should be somewhat lighter than in the preparation of ordinary tablets. It is to be understood that tablets produced according to our new process have a considerably greater volume than do ordinary compressed tablets as hitherto known.

In view of the foregoing, it is surprising that, by the present improved process, it is possible to grind the dry mixture of tablet base and lather, and to compress it into tablets which are readily disintegrable in water.

The following examples are intended to serve merely as illustrations of preferred methods of carrying out the process of the present invention, and it is to be understood that we are not to be precisely limited thereto. It will also be obvious that the method of desiccation immediately after admixture with the aqueous lather by rapid heating and/or under vacuum; the materials employed for producing the lathers; and their adaptation for special purposes; and other of the several successive and interrelated steps—as set forth herein in general and by specific illustration—are all manifestly subject to considerable modification within the spirit and scope of this disclosure.

*Examples*

(1) About 10 kg. of pulverized sodium chloride are gently mixed with a lather made of 60 gms. of white gelatin and 2 liters of water. The moist mixture is dried at 40° C., as quickly as possible, preferably under vacuum, and the dried material ground to a coarse powder and compressed into tablets.

(2) About 10 kg. of pulverized sodium chloride are gently mixed with a lather made of 60 gms. of white gelatin and 2 liters of water. The moist mixture is dried at 120° C. under ordinary pressure for about 1-2 hours. The dried material is then ground to a coarse powder and compressed into tablets.

(3) About 10 kg. of pulverized quinine dichlorhydrate are carefully mixed with a lather made of about 75 gms. of white gelatin and 3 liters of water, and dried at 40° C. as quickly as possible, preferably under vacuum. The mass is coarsely ground, sifted, and pressed into tablets.

(4) About 10 kg. of pulverized hexamethylene-tetramine are mixed with a lather consisting of about 12 gms. of guaiaci-saponin, 360 gms. of capillary syrup, and 828 gms. of distilled water, and dried at about 40° C., preferably under vacuum. The dried mass is coarsely ground, sifted, and pressed into tablets.

(5) A blue-colored powdery mixture of 5 kg. of mercury-oxycyanide, 2 kg. sodium bicarbonate, and 3 kg. of sodium chloride, are mixed with a solution of 40 gms. of dried egg albumin, 600 gms. of capillary syrup, and 1.360 liters of distilled water which has been whipped into a firm lather. The mixture is dried under ordinary pressure at about 40° C. The dried mass is coarsely pulverized, sifted, and pressed into tablets.

We claim as our invention:

1. A process for the production of tablets capable of rapid disintegration in water which comprises mixing a powdered tablet-base material with the aqueous lather of a foam producing substantially inert substance, rapidly drying the mixture to free it from excess moisture, coarsely grinding the dried porous mass, and then pressing the porous ground material into tablet form.

2. A process for the production of tablets capable of rapid disintegration in water which comprises mixing a powdered tablet-base material with the aqueous lather of a foam producing substance substantially non-reactive with the ingredients to be tabletted, rapidly drying the mixture to free it from excess moisture, coarsely grinding the dried porous mass, and then pressing the porous ground material into tablet form.

3. A process for the production of tablets capable of rapid disintegration in water which comprises mixing a powdered tablet-base material with the aqueous lather of a foam producing substance substantially non-reactive with the ingredients to be tabletted, rapidly drying the mixture by controlled heat under vacuum to free it from excess moisture, coarsely grinding the dried porous mass, and then pressing the porous ground material into tablet form.

4. A process for the production of tablets capable of rapid disintegration in water which comprises mixing a powdered tablet-base material with an aqueous lather of gelatin, quckly drying the lather impregnated material, grinding the resulting porous mass to coarse particles, and then pressing the same into tablet form.

5. A process for the production of tablets capable of rapid disintegration in water which comprises mixing powdered hexamethylene-tetramine with an aqueous lather of guaiaci-saponin and capillary syrup, quickly drying the mixture to remove excess moisture, coarsely grinding the resulting porous mass, and pressing into tablet form.

6. A process for the production of tablets capable of rapid disintegration in water which comprises mixing powdered quinine dihydrochloride with an aqueous lather of gelatin, quickly drying the mixture to remove excess moisture, coarsely grinding the resulting porous mass and pressing into tablet form.

7. A process for the production of tablets capable of rapid disintegration in water which comprises mixing powdered sodium chloride with an aqueous lather of gelatine, quickly drying the mixture to remove excess moisture, coarsely grinding the resulting porous mass, and pressing into tablet form.

8. The process for the production of tablets capable of rapid disintegration in water which comprises mixing a powdered tablet-base material with the aqueous lather of a foam-producing substance, substantially non-reactive with the ingredients to be tabletted, drying the mixture to free it from excess moisture, coarsely grinding the dried coarse mass, and then pressing the porous ground material into tablet form.

9. Compressed tablets capable of rapid disintegration in water obtained by mixing a powdered tablet-base material with an aqueous lather of a foam-producing substance, substantially non-reactive with the ingredients to be tabletted, drying the mixture to free it from excess moisture, coarsely grinding the dried porous mass and then pressing the porous ground material into tablet form.

10. Compressed tablets capable of rapid disintegration in water obtained by mixing a powdered tablet-base material with an aqueous lather of gelatin, drying the mixture to free it from excess moisture, coarsely grinding the dried porous mass, and then pressing the porous ground material into tablet form.

11. Compressed tablets capable of rapid disintegration in water obtained by mixing a powdered tablet-base material with an aqueous lather of saponin, drying the mixture to free it from excess moisture, coarsely grinding the dried porous mass, and then pressing the porous ground material into tablet form.

12. Compressed tablets capable of rapid disintegration in water obtained by mixing a powdered tablet-base material with an aqueous lather of albumin, drying the mixture to free it from excess moisture, coarsely grinding the dried porous mass, and then pressing the porous ground material into tablet form.

BERNHARD RAPP.
FRIEDRICH K. RUSSOW.